United States Patent
Kita et al.

(10) Patent No.: US 10,298,918 B2
(45) Date of Patent: May 21, 2019

(54) IMAGE PROJECTION APPARATUS

(71) Applicant: SONY CORPORATION, Tokyo (JP)

(72) Inventors: Koji Kita, Kanagawa (JP); Jyunpei Nakajima, Kanagawa (JP); Yuji Manabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/759,007

(22) PCT Filed: Jan. 7, 2014

(86) PCT No.: PCT/JP2014/050070
§ 371 (c)(1),
(2) Date: Jul. 2, 2015

(87) PCT Pub. No.: WO2014/132675
PCT Pub. Date: Sep. 4, 2014

(65) Prior Publication Data
US 2015/0350630 A1  Dec. 3, 2015

(30) Foreign Application Priority Data

Feb. 27, 2013 (JP) ................. 2013-037783

(51) Int. Cl.
*G02B 27/26* (2006.01)
*H04N 13/337* (2018.01)
(Continued)

(52) U.S. Cl.
CPC ......... *H04N 13/337* (2018.05); *G03B 21/005* (2013.01); *G03B 33/06* (2013.01);
(Continued)

(58) Field of Classification Search
CPC .... G02B 27/26; G03B 35/26; G03B 21/2073; G03B 33/12; H04N 9/3167; H04N 13/0422; H04N 13/0459; H04N 13/0434
(Continued)

(56) References Cited

U.S. PATENT DOCUMENTS 5,028,121 A * 7/1991 Baur .................... G02B 27/283
348/E9.027
6,190,014 B1 * 2/2001 Kusano ................ G02B 27/145
348/E5.141
(Continued)

FOREIGN PATENT DOCUMENTS

JP  11-281931 A  10/1999
JP  11-289559 A  10/1999
(Continued)

OTHER PUBLICATIONS

International Search Report dated Apr. 15, 2014 in PCT/JP2014/050070.
(Continued)

*Primary Examiner* — Steven Whitesell Gordon
*Assistant Examiner* — Jerry L Brooks
(74) *Attorney, Agent, or Firm* — Oblon, McClelland, Maier & Neustadt, L.L.P.

(57) ABSTRACT

Provided is an image projection apparatus including: one or more light sources; one or more illumination optical systems; a first reflection-type light valve group including three light valves and being configured to modulate incident light based on first image information; a second reflection-type light valve group including three light valves and being configured to modulate incident light based on second image information; a first prism-type photosynthesizing member having a function of synthesizing, on one optical axis, light that is reflected by the first reflection-type light valve group;
(Continued)

a second prism-type photosynthesizing member having a function of synthesizing, on one optical axis, light that is reflected by the second reflection-type light valve group; and a prism-type beam splitter configured to synthesize, on one optical axis, light that has been reflected by the first reflection-type light valve group and light that has been reflected by the second reflection-type light valve group.

11 Claims, 7 Drawing Sheets

(51) Int. Cl.
| | |
|---|---|
| H04N 9/31 | (2006.01) |
| H04N 13/365 | (2018.01) |
| H04N 13/346 | (2018.01) |
| G03B 33/06 | (2006.01) |
| G03B 33/12 | (2006.01) |
| G03B 35/26 | (2006.01) |
| G03B 21/00 | (2006.01) |
| H04N 13/324 | (2018.01) |
| H04N 13/363 | (2018.01) |

(52) U.S. Cl.
CPC ............ *G03B 33/12* (2013.01); *G03B 35/26* (2013.01); *H04N 9/3105* (2013.01); *H04N 9/3138* (2013.01); *H04N 9/3164* (2013.01); *H04N 9/3194* (2013.01); *H04N 9/3197* (2013.01); *H04N 13/324* (2018.05); *H04N 13/346* (2018.05); *H04N 13/363* (2018.05); *H04N 13/365* (2018.05)

(58) Field of Classification Search
USPC ....... 353/7, 8, 20; 359/464, 465; 348/51, 54, 348/57, 58; 349/15
See application file for complete search history.

(56) References Cited

U.S. PATENT DOCUMENTS

| | | | | |
|---|---|---|---|---|
| 8,388,138 | B1* | 3/2013 | Boothroyd | G02B 27/26 348/51 |
| 2002/0063853 | A1* | 5/2002 | Maki | G02B 27/1026 353/53 |
| 2003/0231287 | A1 | 12/2003 | Maki et al. | |
| 2004/0066492 | A1* | 4/2004 | Nakashima | G03B 21/16 353/20 |
| 2004/0150796 | A1* | 8/2004 | Yoneyama | G02B 5/04 353/33 |
| 2005/0185139 | A1 | 8/2005 | Yamanaka et al. | |
| 2006/0221447 | A1* | 10/2006 | DiZio | G02B 27/283 359/487.04 |
| 2006/0290889 | A1* | 12/2006 | Robinson | G02B 27/26 353/8 |
| 2009/0009719 | A1* | 1/2009 | Ryf | H04M 1/0272 353/20 |
| 2009/0213330 | A1 | 8/2009 | Silverstein et al. | |
| 2010/0171890 | A1 | 7/2010 | Furukawa et al. | |
| 2010/0253769 | A1* | 10/2010 | Coppeta | G02B 27/1026 348/58 |
| 2011/0019153 | A1* | 1/2011 | Lee | G02B 27/26 353/8 |
| 2011/0032485 | A1* | 2/2011 | Hsiung | G02B 27/48 353/20 |
| 2011/0109820 | A1 | 5/2011 | Silverstein et al. | |
| 2012/0307362 | A1 | 12/2012 | Silverstein et al. | |

FOREIGN PATENT DOCUMENTS

| | | |
|---|---|---|
| JP | 2000-59821 A | 2/2000 |
| JP | 2002-90874 A | 3/2002 |
| JP | 2004-219971 A | 8/2004 |
| JP | 2005-241870 A | 9/2005 |
| JP | 2006-39201 A | 2/2006 |
| JP | 2007-286516 A | 11/2007 |
| JP | 2009-300914 A | 12/2009 |
| JP | 2010-122589 A | 6/2010 |
| JP | 2012-47849 A | 3/2012 |
| JP | 2012-151713 A | 8/2012 |
| WO | WO 2009/041038 A1 | 4/2009 |
| WO | WO 2011/059879 A1 | 5/2011 |
| WO | WO 2012/114522 A1 | 8/2012 |

OTHER PUBLICATIONS

Search Report dated Oct. 12, 2016, in European Patent Application No. 14757250.

Office Action dated Jul. 28, 2016, in Chinese Patent Application No. 201480009555.0 (with English language translation).

Office Action dated Sep. 12, 2017 in Japanese Patent Application No. 2015-502793.

* cited by examiner

IMAGE PROJECTION APPARATUS

TECHNICAL FIELD

The present technology relates to an image projection apparatus.

BACKGROUND ART

In recent years, digitalization has progressed in the cinema industry, accompanying higher resolution of images and the spread of 3D (three-dimensional; stereoscopic) films. With regard to higher resolution, the spread of what is called 4K images having resolutions of approximately 4000×2000 has progressed.

With regard to 3D images, production techniques have been developed, and films that put less strain on viewers' eyes and allow the viewers to enjoy watching movies for a long time have been released one after another, contributing to increased box-office revenue in the cinema industry.

As techniques for projecting 3D images, some methods, which are described below, have been proposed and put into use.

There is a method in which, by one projector, images for the left and right eyes are switched by time division between polarized light beams orthogonal to each other to be projected, and the images are viewed with glasses that have polarizing filters with planes of polarization orthogonal to each other for the left and right eyes (e.g., see Patent Literature 1).

Note that "polarized light beams orthogonal to each other" mean two linearly polarized light beams whose planes of polarization differ by 90 degrees in some cases, and mean left-handed and right-handed circularly polarized light in other cases. The same applies to the description below.

There is also a method in which two projectors are provided for right-eye images and left-eye images, light beams are projected from the respective projectors as polarized light beams orthogonal to each other, and the images are viewed with glasses that have polarizing filters with planes of polarization orthogonal to each other for the left and right eyes (e.g., see Patent Literature 2).

There is also a method in which an image display part of one light valve is divided into a right-eye image display range and a left-eye image display range, images displayed in these ranges are emitted from a projection lens as polarized light beams orthogonal to each other, and these images are projected to be superimposed on a screen. Also in this method, the images are viewed with glasses that have polarizing filters with planes of polarization orthogonal to each other for the left and right eyes (e.g., see Patent Literature 3).

Furthermore, in order that sufficiently bright 2D (two-dimensional; planar) images and 3D images can be shown even on large screens, projectors of higher output are desired.

CITATION LIST

Patent Literature

Patent Literature 1: JP 2012-151713A
Patent Literature 2: JP 2012-47849A
Patent Literature 3: JP 2009-300914A

SUMMARY OF INVENTION

Technical Problem

However, in the case of a method in which left and right images are switched and generated by time division, as in Patent Literature 1, light enters only one of the left and right eyes. Therefore, when 3D images are projected, light emitted from the projector cannot be wholly utilized, and the brightness of a screen is lowered to half or less in appearance.

In the case of a method in which two projectors are used, as in Patent Literature 2, complicated adjustment is needed to superimpose the projected images from the projectors accurately on a screen. In addition, since two projectors are needed, cost is increased accordingly, and a larger space is required for installation of the projectors.

In the case of a method in which 3D images are projected by dividing an image display part of one light valve, as in Patent Literature 3, the original resolution cannot be utilized because the original image display part of the light valve is partially used, and a projection lens for only 3D is required. In addition, brightness gets darker than in the case where the whole of the image display part is used.

When 2D images are to be projected utilizing the resolution of the whole light valve, there is a need for a replacement between the lens for only 3D and a lens for 2D. In this case, if left and right images are the same, the images can be viewed as 2D even with the lens for only 3D; however, resolution and brightness unfortunately get lower than in the case where images are projected with the lens for 2D.

An object of the present technology is to provide an image projection apparatus that can display 3D images without sacrificing brightness or resolution, and can switch between and display 3D images and 2D images.

Solution to Problem

According to the present technology, there is provided an image projection apparatus including: one or more light sources configured to emit light including one or more of three primary colors of light; one or more illumination optical systems configured to illuminate light from the light sources; a first reflection-type light valve group including three light valves corresponding to the three primary colors of light, the first reflection-type light valve group being configured to modulate incident light from the illumination optical systems based on first image information; a second reflection-type light valve group including three light valves corresponding to the three primary colors of light, the second reflection-type light valve group being configured to modulate incident light from the illumination optical systems based on second image information; a first prism-type photosynthesizing member having a function of synthesizing, on one optical axis, light that is reflected by the first reflection-type light valve group, the light having been separated into the three primary colors; a second prism-type photosynthesizing member having a function of synthesizing, on one optical axis, light that is reflected by the second reflection-type light valve group, the light having been separated into the three primary colors; and a prism-type beam splitter configured to synthesize, on one optical axis, light that has been reflected by the first reflection-type light valve group and modulated based on the first image information and light that has been reflected by the second reflection-type light valve group and modulated based on the second image information.

According to the configuration of the image projection apparatus of the present technology described above, the first image information and the second image information are reflected, respectively, by the first reflection-type light valve group and the second reflection-type light valve group, each light valve group including three light valves, and are synthesized on one optical axis by the prism-type beam splitter.

With this configuration, the first image information and the second image information can be displayed using the whole of display parts of the reflection-type light valve groups. Therefore, neither resolution nor brightness is sacrificed. Furthermore, there is no need for time division of images and no sacrifice of brightness accompanying such time division.

In addition, 2D images can be projected by setting the same image information as the two pieces of image information or turning off one of the two pieces of image information, and 3D images can be projected by setting different pieces of image information corresponding to the left and right eyes as the two pieces of image information.

Advantageous Effects of Invention

According to the present technology described above, an image projection apparatus that displays 3D images without sacrificing brightness or resolution can be implemented.

Furthermore, since the first image information and the second image information are synthesized on one optical axis, by setting out the two reflection-type light valve groups in advance such that the images are superimposed on the screen, labor for adjusting the superimposition of left and right images on-site (e.g., at the theater) is saved.

In addition, since it is unnecessary to provide a plurality of image projection apparatuses, cost can be saved and the apparatus does not need a large installation space.

In addition, since the switching between 2D images and 3D images can be performed by only switching the image information, there is no need for labor and time for a lens replacement or the like, and the switching between 2D images and 3D images can be performed easily and instantaneously.

According to the present technology, a maintenance-free image projection apparatus that can switch between and display 2D images and 3D images and does not require labor for adjustment of the apparatus, replacement of a part, or the like can be implemented.

DESCRIPTION OF EMBODIMENTS

Hereinafter, best modes (hereinafter called embodiments) for carrying out the present technology will be described.

The description is given in the following order.
1. First Embodiment
2. Second Embodiment
<1. First Embodiment>

Figure 1:
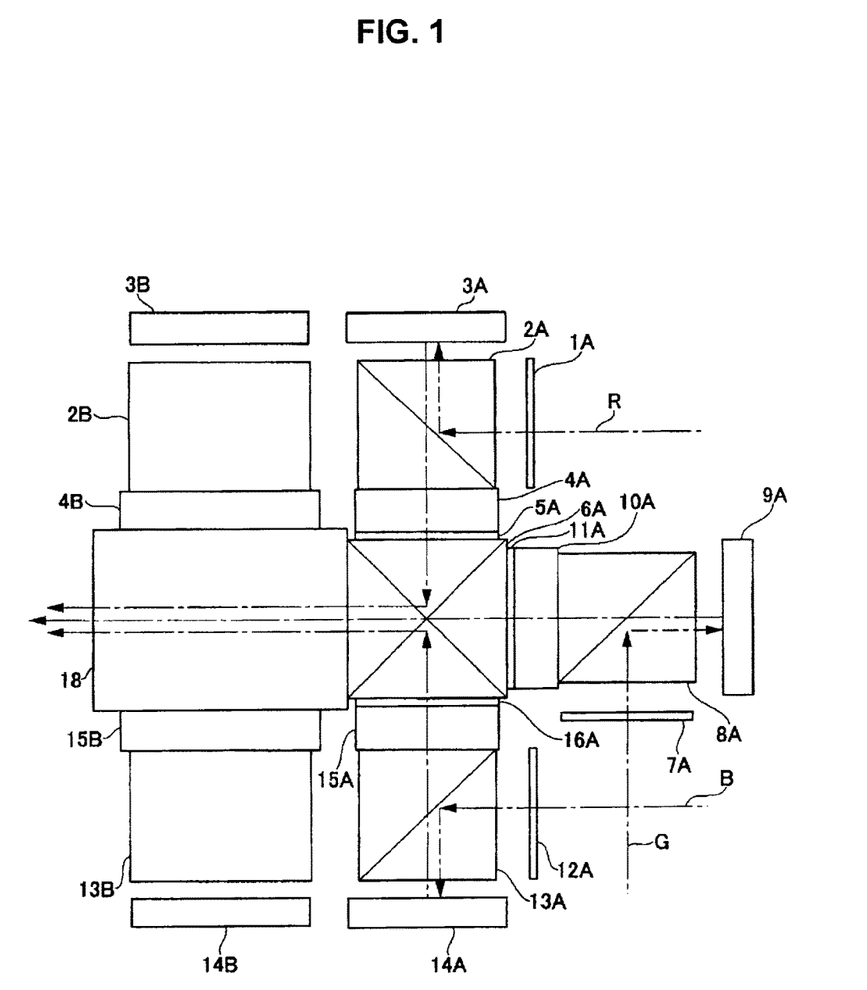
FIG. 1 is a schematic configuration view of an image projection apparatus of a first embodiment.
Figure 2:
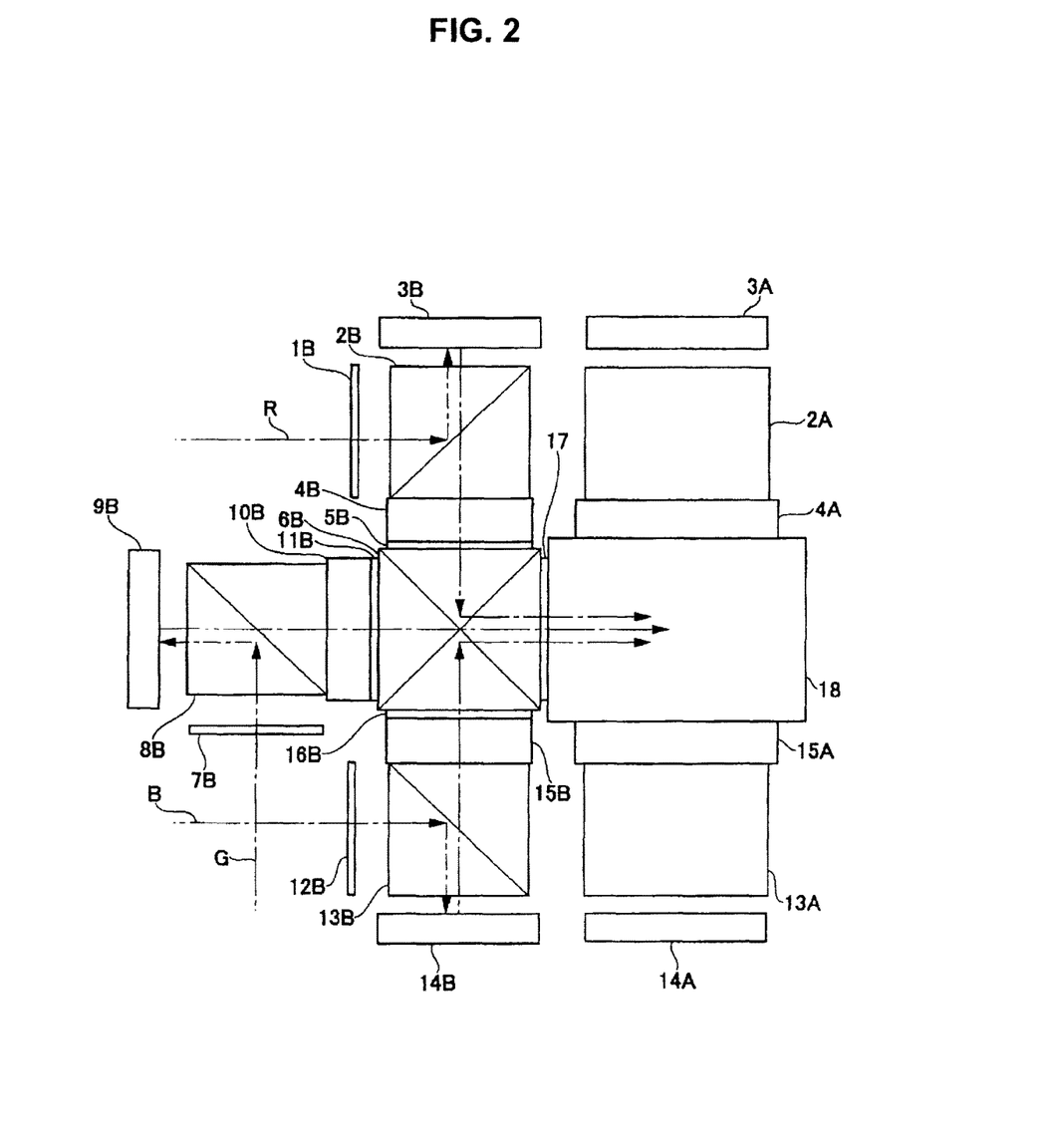
FIG. 2 is a schematic configuration view of an image projection apparatus of the first embodiment.
Figure 3:
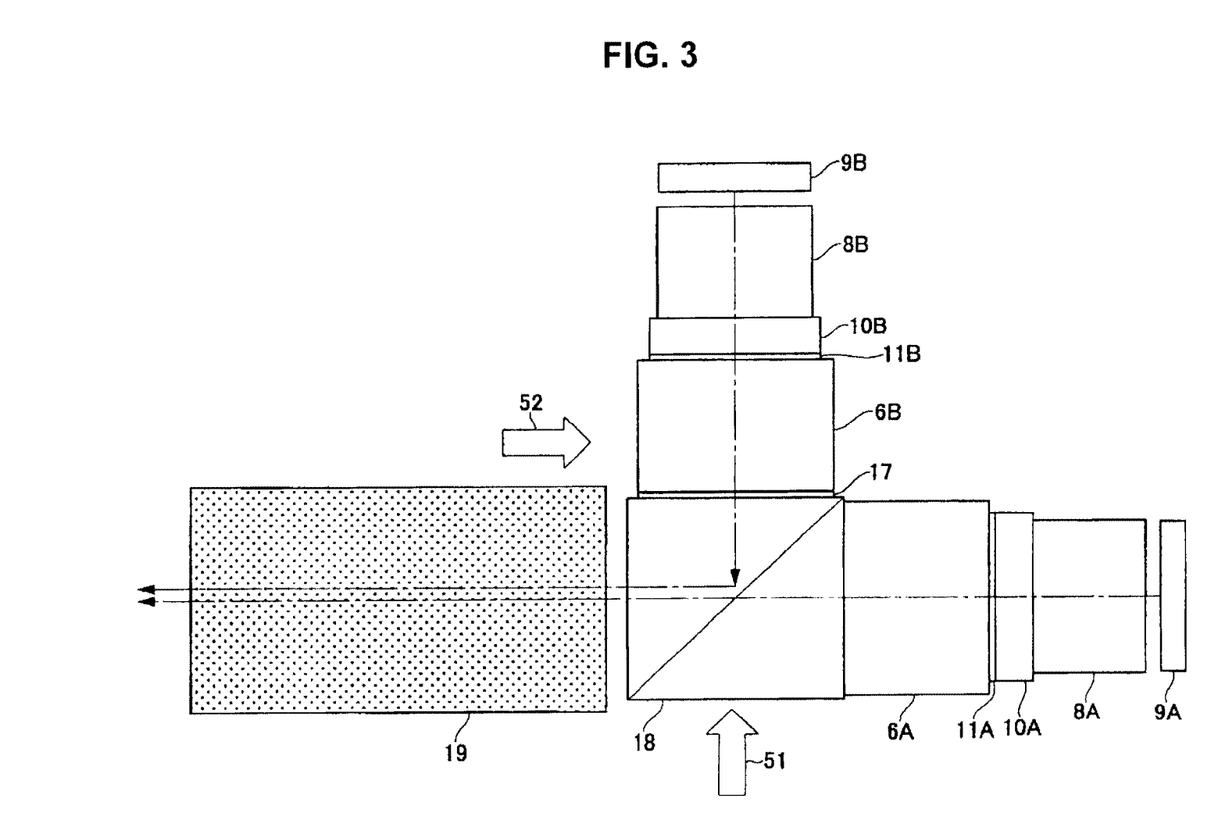
FIG. 3 is a schematic configuration view of an image projection apparatus of the first embodiment.

FIGS. 1 to 3 are schematic configuration views of an image projection apparatus of a first embodiment. FIGS. 1 and 2 are side views, and FIG. 3 is a top view. FIGS. 1 and 2 are side views seen from the directions of an arrow 51 and an arrow 52 in FIG. 3, respectively. In FIG. 3, for the sake of clarity, only components placed along a plane including a reflection-type liquid crystal device 9A and a reflection-type liquid crystal device 9B are illustrated, and other components are omitted from the figure.

In addition, in each figure, the path of light is indicated by an arrow drawn with a thin chain line.

According to the present embodiment, 3D (stereoscopic) images are displayed by application of a difference in polarization property, and reflection-type liquid crystal devices are used as light valves.

The image projection apparatus of the present embodiment includes the following components: light valves configured with reflection-type liquid crystal devices, a prism-type photosynthesizing member, a prism-type polarizing beam splitter, a cross dichroic prism (also called 4P prism), and a projection lens.

These components are placed such that their relative positional relationship has excellent precision.

For example, it is preferred to join these components to each other to configure an integrated optical block.

In addition, each reflection-type liquid crystal device (light valve) and the prism-type polarizing beam splitter are preferably joined mechanically and fixed with a metal part or the like which is not shown.

Furthermore, although not shown, the image projection apparatus of the present embodiment is provided with light sources that emit light of the three primary colors, in other words, red light R, green light G, and blue light B, respectively.

Light emitted from the projection lens is projected onto a screen or the like which is not shown; thus, images are displayed.

The image projection apparatus of the present embodiment includes, specifically, an optical system for projecting an image based on first image information, an optical system for projecting an image based on second image information, and a prism-type beam splitter and a projection lens which are shared by the optical systems.

Each optical system is provided with the above-described light sources that emit red light R, green light G, and blue light B, respectively; that is, six light sources are included in total. A reflection-type liquid crystal device, a photosynthesizing member, and a polarizing beam splitter are provided for each of the six light sources.

Hereinafter, the configuration and placement of each optical part will be described specifically.

The optical system (hereinafter called first optical system) for projecting an image based on the first image information is provided with three light sources that emit, respectively, red light R, green light G, and blue light B, which are the three primary colors of light. As a first reflection-type light valve group including three light valves, reflection-type liquid crystal devices 3A, 9A, and 14A are provided for the respective three light sources. In addition, as a first prism-type photosynthesizing member having a function of synthesizing light of the three primary colors on one optical axis, polarizing beam splitters 2A, 8A, and 13A and a cross dichroic prism 6A, each of which is formed of a glass material, are provided.

A polarizing plate 1A, the polarizing beam splitter 2A, the reflection-type liquid crystal device 3A, a spacer 4A, and a half-wave plate 5A are provided for the red light R.

A polarizing plate 7A, the polarizing beam splitter 8A, the reflection-type liquid crystal device 9A, a spacer 10A, and a half-wave plate 11A are provided for the green light G.

A polarizing plate 12A, the polarizing beam splitter 13A, the reflection-type liquid crystal device 14A, a spacer 15A, and a half-wave plate 16A are provided for the blue light B.

Furthermore, the cross dichroic prism 6A is provided to merge the red light R, the green light G, and the blue light B.

Note that an illumination optical system which is not shown is provided between each light source and the corresponding one of the polarizing plates 1A, 7A, and 12A.

Like the first optical system, the optical system (hereinafter called second optical system) for projecting an image based on the second image information is provided with three light sources that emit, respectively, red light R, green light G, and blue light B, which are the three primary colors of light. As a second reflection-type light valve group including three light valves, reflection-type liquid crystal devices 3B, 9B, and 14B are provided for the respective three light sources. In addition, as a second prism-type photosynthesizing member having a function of synthesizing light of the three primary colors on one optical axis, polarizing beam splitters 2B, 8B, and 13B and a cross dichroic prism 6B, each of which is formed of a glass material, are provided.

A polarizing plate 1B, the polarizing beam splitter 2B, the reflection-type liquid crystal device 3B, a spacer 4B, and a half-wave plate 5B are provided for the red light R.

A polarizing plate 7B, the polarizing beam splitter 8B, the reflection-type liquid crystal device 9B, a spacer 10B, and a half-wave plate 11B are provided for the green light G.

A polarizing plate 12B, the polarizing beam splitter 13B, the reflection-type liquid crystal device 14B, a spacer 15B, and a half-wave plate 16B are provided for the blue light B.

Furthermore, the cross dichroic prism 6B is provided to merge the red light R, the green light G, and the blue light B.

Note that an illumination optical system which is not shown is provided between each light source and the corresponding one of the polarizing plates 1B, 7B, and 12B.

The cross dichroic prism 6A of the first optical system and the cross dichroic prism 6B of the second optical system are each placed upstream from a prism-type beam splitter 18.

A half-wave plate 17 is provided between the cross dichroic prism 6B of the second optical system and the prism-type beam splitter 18.

A projection lens 19 is placed downstream from the prism-type beam splitter 18.

Next, functions of projecting images in the image projection apparatus of the present embodiment will be described in order.

First, a function of projecting an image based on the first image information is described with reference to FIGS. 1 and 3.

The red light R, which is one of the three primary colors of light, is emitted from the light source which is not shown, goes through the illumination optical system which is also not shown, passes through the polarizing plate 1A, and is reflected by the polarizing beam splitter 2A to enter the reflection-type liquid crystal device 3A.

A polarizing beam splitter generally has a property of transmitting P-polarized light and reflecting S-polarized light.

The function of the polarizing plate 1A serves to polarize light from the light source into linearly polarized light with a high degree of polarization and cause the light to enter the polarizing beam splitter 2A as S-polarized light.

The light subjected to polarization-modulation based on image information by the reflection-type liquid crystal device 3A returns to the polarizing beam splitter 2A, only the P-polarized component of the light passing through the polarizing beam splitter 2A, and the image information is converted to light-dark information. Furthermore, the resulting light passes through a spacer glass 4A and enters the half-wave plate 5A.

The thickness of the spacer glass 4A is determined such that the whole optical system including the illumination optical system which is not shown has an optimum layout. The same applies to a spacer glass 10A and a spacer glass 15A which are described later.

The half-wave plate 5A serves to rotate the plane of polarization such that light enters the cross dichroic prism 6A as S-polarized light. This is because a film of the cross dichroic prism 6A that reflects light has high reflectance for S-polarized light and low reflectance for P-polarized light.

Thus, the light subjected to polarization-modulation based on image information by the reflection-type liquid crystal device 3A is reflected by the cross dichroic prism 6A and enters the prism-type beam splitter 18.

The prism-type beam splitter 18 has the property of a polarizing beam splitter having high reflectance for S-polarized light and high transmittance for P-polarized light, with regard to all wavelength ranges of the three primary colors of light which are used. That is, the prism-type beam splitter has spectral properties that cover the three primary colors defined by the light sources.

The light from the cross dichroic prism 6A enters the prism-type beam splitter 18 as P-polarized light. Therefore, the light is transmitted through the prism-type beam splitter 18, and enters and is emitted from the projection lens 19 illustrated in FIG. 3. Thus, an image is projected onto a screen which is not shown.

Next, the green light G, which is one of the three primary colors of light, is emitted from the light source which is not shown, goes through the illumination optical system which is also not shown, passes through the polarizing plate 7A, and is reflected by the polarizing beam splitter 8A to enter the reflection-type liquid crystal device 9A. The function of the polarizing plate 7A is the same as that of the polarizing plate 1A.

The light subjected to polarization-modulation based on image information by the reflection-type liquid crystal device 9A returns to the polarizing beam splitter 8A, only the P-polarized component of the light passing through the polarizing beam splitter 8A, and the image information is converted to light-dark information. Furthermore, the resulting light passes through the spacer glass 10A and enters the half-wave plate 11A.

Like the half-wave plate 5A, the half-wave plate 11A serves to rotate the plane of polarization such that light enters the cross dichroic prism 6A as S-polarized light to be transmitted.

In this manner, the polarization direction of the green light G is matched with the polarization direction of the red light R and the blue light B which is described later; thus, the green light G enters the prism-type beam splitter 18 as P-polarized light to be transmitted through the prism-type beam splitter 18. Then, the light enters and is emitted from the projection lens 19 illustrated in FIG. 3. Thus, an image is projected onto the screen which is not shown.

The blue light B, which is one of the three primary colors of light, is emitted from the light source which is not shown, goes through the illumination optical system which is also not shown, passes through the polarizing plate 12A, and is reflected by the polarizing beam splitter 13A to enter the reflection-type liquid crystal device 14A. The function of the polarizing plate 12A is the same as that of the polarizing plate 1A.

The light subjected to polarization-modulation based on image information by the reflection-type liquid crystal device 14A returns to the polarizing beam splitter 13A, only the P-polarized component of the light passing through the polarizing beam splitter 13A, and the image information is converted to light-dark information. Furthermore, the resulting light passes through the spacer glass 15A and enters the half-wave plate 16A, where the plane of polarization is rotated by 90 degrees.

After that, the blue light B is reflected by the cross dichroic prism 6A to enter the prism-type beam splitter 18 and then is transmitted through the prism-type beam splitter 18. Then, the light enters and is emitted from the projection lens 19 illustrated in FIG. 3. Thus, an image is projected onto the screen which is not shown.

In the above-described manner, the polarization directions of the red, green, and blue light are aligned in one direction, and all of the light enters the prism-type beam splitter 18 as P-polarized light; thus, an image based on the first image information is projected from the projection lens 19 onto the screen which is not shown.

Next, a function of projecting an image based on the second image information is described with reference to FIGS. 2 and 3.

The red light R, which is one of the three primary colors of light, is emitted from the light source which is not shown, goes through the illumination optical system which is also not shown, passes through the polarizing plate 1B, and is reflected by the polarizing beam splitter 2B to enter the reflection-type liquid crystal device 3B.

The light subjected to polarization-modulation based on image information by the reflection-type liquid crystal device 3B returns to the polarizing beam splitter 2B, only the P-polarized component of the light passing through the polarizing beam splitter 2B, and the image information is converted to light-dark information. Furthermore, the resulting light passes through a spacer glass 4B and enters the half-wave plate 5B.

The plane of polarization of the red light R is rotated by 90 degrees by the half-wave plate 5B, and the light enters the cross dichroic prism 6B as S-polarized light. After that, the red light R is reflected by the cross dichroic prism 6B and enters the half-wave plate 17.

The half-wave plate 17 has a function of rotating the polarization direction by 90 degrees, with regard to all wavelength ranges of the three primary colors of light which are used. Therefore, the polarization direction of light transmitted through the half-wave plate 17 is rotated by 90 degrees, and the light enters the prism-type beam splitter 18 as S-polarized light. Then, the light is reflected by the prism-type beam splitter 18, and enters and is emitted from the projection lens 19 illustrated in FIG. 3. Thus, an image is projected onto the screen which is not shown.

Next, the green light G, which is one of the three primary colors of light, is emitted from the light source which is not shown, goes through the illumination optical system which is also not shown, passes through the polarizing plate 7B, and is reflected by a light beam splitter 8B to enter the reflection-type liquid crystal device 9B.

The light subjected to polarization-modulation based on image information by the reflection-type liquid crystal device 9B returns to the polarizing beam splitter 8B, only the P-polarized component of the light passing through the polarizing beam splitter 8B, and the image information is converted to light-dark information. Furthermore, the resulting light passes through a spacer glass 10B and enters the half-wave plate 11B.

The plane of polarization of the green light G is rotated by 90 degrees by the half-wave plate 11B, and then the green light G is transmitted through the cross dichroic prism 6B to enter the half-wave plate 17.

The plane of polarization of the green light G is rotated by 90 degrees again by the half-wave plate 17, and the light enters the prism-type beam splitter 18 as S-polarized light. Furthermore, the green light G is reflected by the prism-type beam splitter 18, and enters and is emitted from the projection lens 19 illustrated in FIG. 3. Thus, an image is projected onto the screen which is not shown.

The blue light B, which is one of the three primary colors of light, is emitted from the light source which is not shown, goes through the illumination optical system which is also not shown, passes through the polarizing plate 12B, and is reflected by the polarizing beam splitter 13B to enter the reflection-type liquid crystal device 14B.

The light subjected to polarization-modulation based on image information by the reflection-type liquid crystal device 14B returns to the polarizing beam splitter 13B, only the P-polarized component of the light passing through the polarizing beam splitter 13B, and the image information is converted to light-dark information. Furthermore, the resulting light passes through a spacer glass 15B and enters the half-wave plate 16B.

The plane of polarization of the blue light B is rotated by 90 degrees by the half-wave plate 16B, and then the blue light B is reflected by the cross dichroic prism 6B to enter the half-wave plate 17.

The plane of polarization of the blue light B is rotated by 90 degrees again by the half-wave plate 17, and the light enters the prism-type beam splitter 18 as S-polarized light. Furthermore, the blue light B is reflected by the prism-type beam splitter 18, and enters and is emitted from the projection lens 19 illustrated in FIG. 3. Thus, an image is projected onto the screen which is not shown.

In the above-described manner, the polarization directions of the red, green, and blue light are aligned in one direction, and all of the light enters the prism-type beam splitter 18 as S-polarized light; thus, an image based on the second image information is projected from the projection lens 19 onto the screen which is not shown.

Note that an image based on the first image information and an image based on the second image information which are projected by the above method have different polarization states. Accordingly, as the screen, it is preferred to use a screen such as a bead screen where the polarization state of reflected light is maintained.

When 3D images are viewed, an image based on the first image information and an image based on the second image information are allocated to one of an image for the right eye and an image for the left eye and the other, respectively.

For example, the first image information projected as P-polarized light is set as an image for the right eye, and the second image information projected as S-polarized light is set as an image for the left eye. In this case, the images are viewed with glasses provided with a polarizing filter that transmits P-polarized light for the right eye and a polarizing filter that transmits S-polarized light for the left eye.

It should be understood that the left and right in the above combination can be reversed.

In addition, a quarter-wave plate can be provided at a light emission part of the prism-type beam splitter 18 such that the orientation is 45 degrees with respect to the plane of P-polarization defined by the prism-type beam splitter 18.

By providing a quarter-wave plate in this way, the polarization state of light emitted from the prism-type beam splitter 18 can be changed from linearly polarized light beams orthogonal to each other into left-handed and right-handed circularly polarized light.

In the case of this configuration, it is particularly preferred to use a wide-band quarter-wave plate that covers the wavelength range of light which is used.

In addition, in the case of this configuration, a filter for right-handed circular polarization and a filter for left-handed circular polarization are used in combination as the polarizing filters of the glasses. Configuring the glasses in this way makes it possible to reduce the occurrences of what is called crosstalk, which is a phenomenon where light which is to enter one eye leaks into the other eye when a viewer looks at the screen with his/her head inclined.

Furthermore, when 2D images are viewed, the first image information and the second image information are projected as the same image information. In this case, the screen need not be a screen where the polarization state of reflected light is maintained, and the glasses are unnecessary.

It is also possible to display 2D images by turning off one of the first image information and the second image information.

Although the image projection apparatus of the present embodiment includes a large number of optical parts as described above, the whole apparatus can be configured to have a small size.

For example, by adopting a reflection-type liquid crystal device with a diagonal dimension of an image display range of 40 mm and setting an F value of the illumination system to 3.0 or more, the size of the prism-type beam splitter 18, which is the largest member, can be set to 80 mm square or smaller. Thus, the prism-type beam splitter 18 can be fabricated with a size that is practical for production.

In the image projection apparatus of the present embodiment, it is preferred to use a glass material with a refractive index nd of 1.84 or more for the first prism-type photosynthesizing member, the second prism-type photosynthesizing member, and the prism-type polarizing beam splitter, each of which is formed of a glass material. Using a glass material with a refractive index nd of 1.84 or more allows a reduction in the size of a luminous flux that is reflected by the reflection-type liquid crystal device, goes through the prism-type polarizing beam splitter, and enters the projection lens. Thus, the sizes of the prism-type polarizing beam splitter and the projection lens can be set small enough to be practical for production.

As the light source of the image projection apparatus of the present embodiment, a laser light source or a lamp light source can be used.

In particular, it is preferred to use a laser light source.

Laser light sources are superior in that they can improve collection efficiency. Therefore, using a laser light source makes it possible to obtain brightness several times as high as 4.5 ft (ft: foot-lambert, a unit of brightness), which is the digital cinema standard for 3D movies. In addition, since collection efficiency can be improved, the illumination optical system is allowed to have a large F value, and a large amount of light can be projected on to the screen even with an optical system with a large F value.

In addition, by using a laser light source, the straightness of light is improved and the spread of a luminous flux is reduced; thus, each optical part and the whole apparatus can be configured to have small sizes.

Furthermore, by using a laser light source, the lifetime of the light source can be extended as compared with a discharge tube type light source, such as a xenon lamp, conventionally used in image projection apparatuses. Therefore, an effect of reducing maintenance cost that accompanies a light source replacement can be expected.

In addition, by using a reflection-type liquid crystal device with a diagonal dimension of an image display range of 18 mm or more in combination with a laser light source, a cinema projector having a total output of 15000 lumens or more for 2D images can be implemented. With this brightness, sufficient brightness for watching movies can be achieved even at theaters with mid-size or smaller screens.

According to the configuration of the image projection apparatus of the present embodiment described above, the first image information and the second image information are reflected by the respective two sets of reflection-type liquid crystal devices, each set including three reflection-type liquid crystal devices, synthesized on one optical axis by the prism-type beam splitter, and projected with the single projection lens.

With this configuration, each piece of image information is displayed using the whole of image display parts of the reflection-type liquid crystal devices. Therefore, neither resolution nor brightness is sacrificed. Furthermore, there is no need for time division of images and no sacrifice of brightness accompanying such time division.

Therefore, it is possible to provide an image projection apparatus that displays 3D images, without sacrificing brightness or resolution.

Furthermore, since the first image information and the second image information are synthesized on one optical axis, by setting out the two sets of reflection-type liquid crystal devices in advance such that the images are superimposed on the screen, labor for adjusting the superimposition of left and right images on-site (e.g., at the theater) is saved.

In addition, since it is unnecessary to provide a plurality of image projection apparatuses, cost can be saved and the apparatus does not need a large installation space.

In addition, 2D images can be projected by setting the same image information as the two pieces of image information or turning off one of the two pieces of image information, and 3D images can be projected by setting different pieces of image information corresponding to the left and right eyes as the two pieces of image information. Since the switching between 2D images and 3D images can be performed by only switching the image information in this way, there is no need for labor and time for a lens replacement or the like, and the switching between 2D images and 3D images can be performed easily and instantaneously.

According to the configuration of the image projection apparatus of the present embodiment, a maintenance-free image projection apparatus that can switch between and display 2D images and 3D images and does not require labor for adjustment of the apparatus, replacement of a part, or the like can be implemented.

<2. Second Embodiment>

Figure 4:
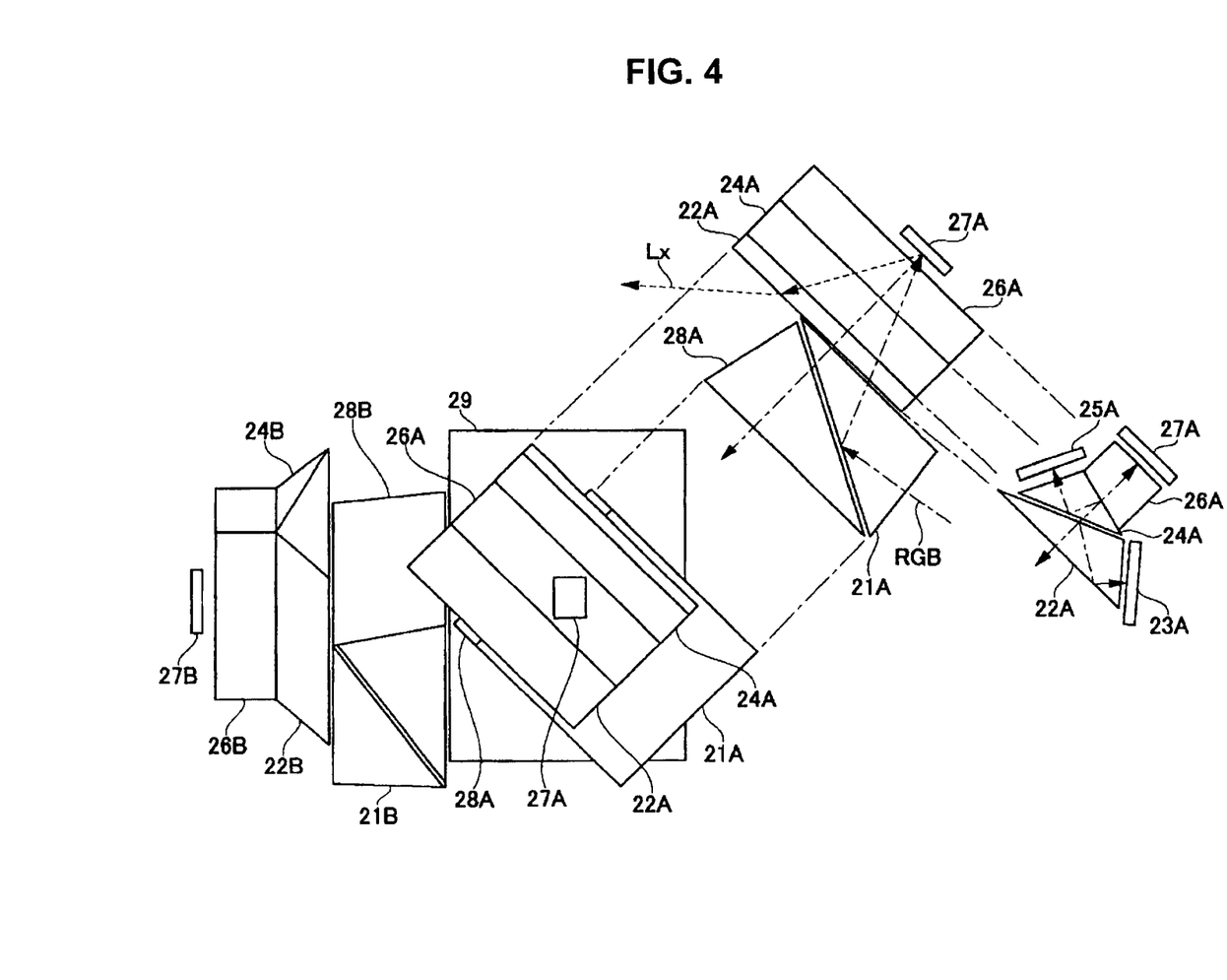
FIG. 4 is a schematic configuration view of an image projection apparatus of a second embodiment.
Figure 5:
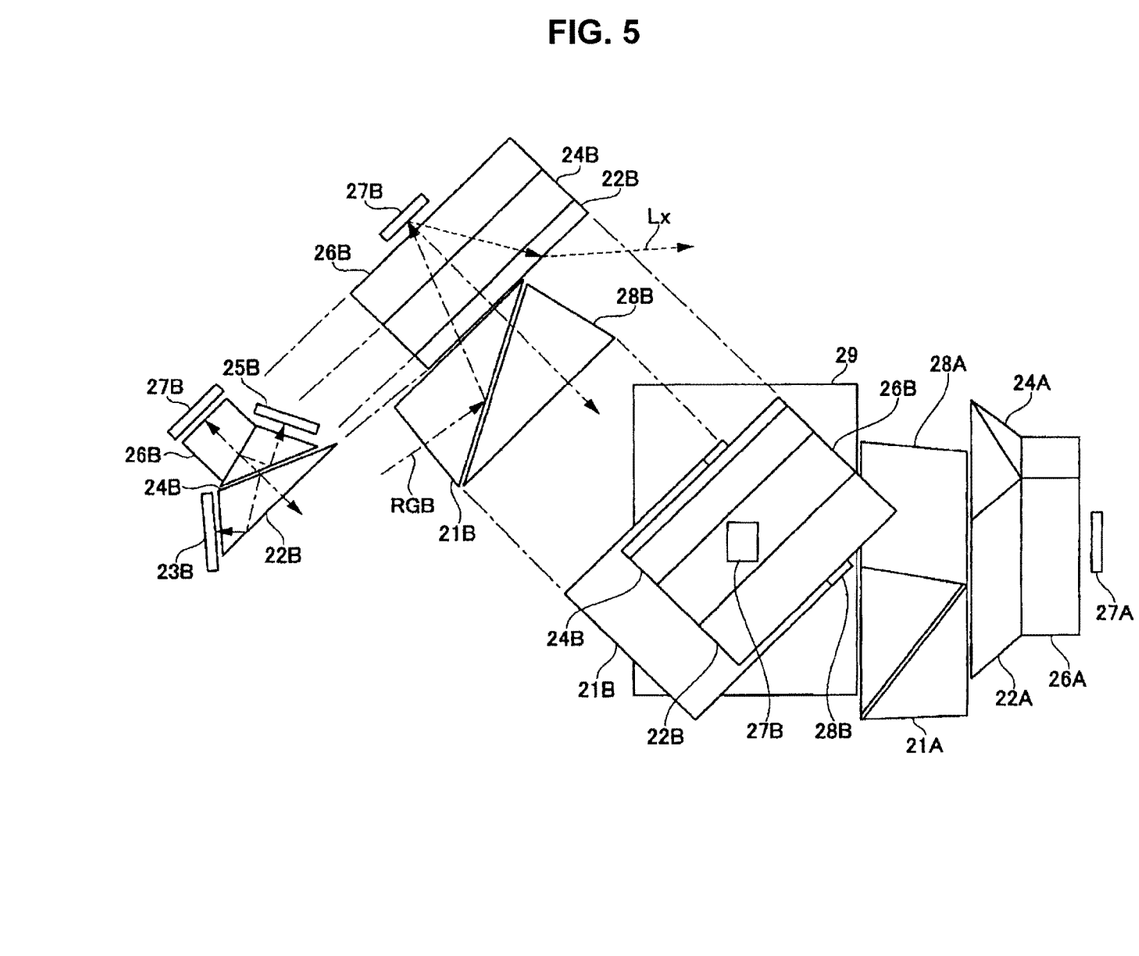
FIG. 5 is a schematic configuration view of an image projection apparatus of the second embodiment.
Figure 6:
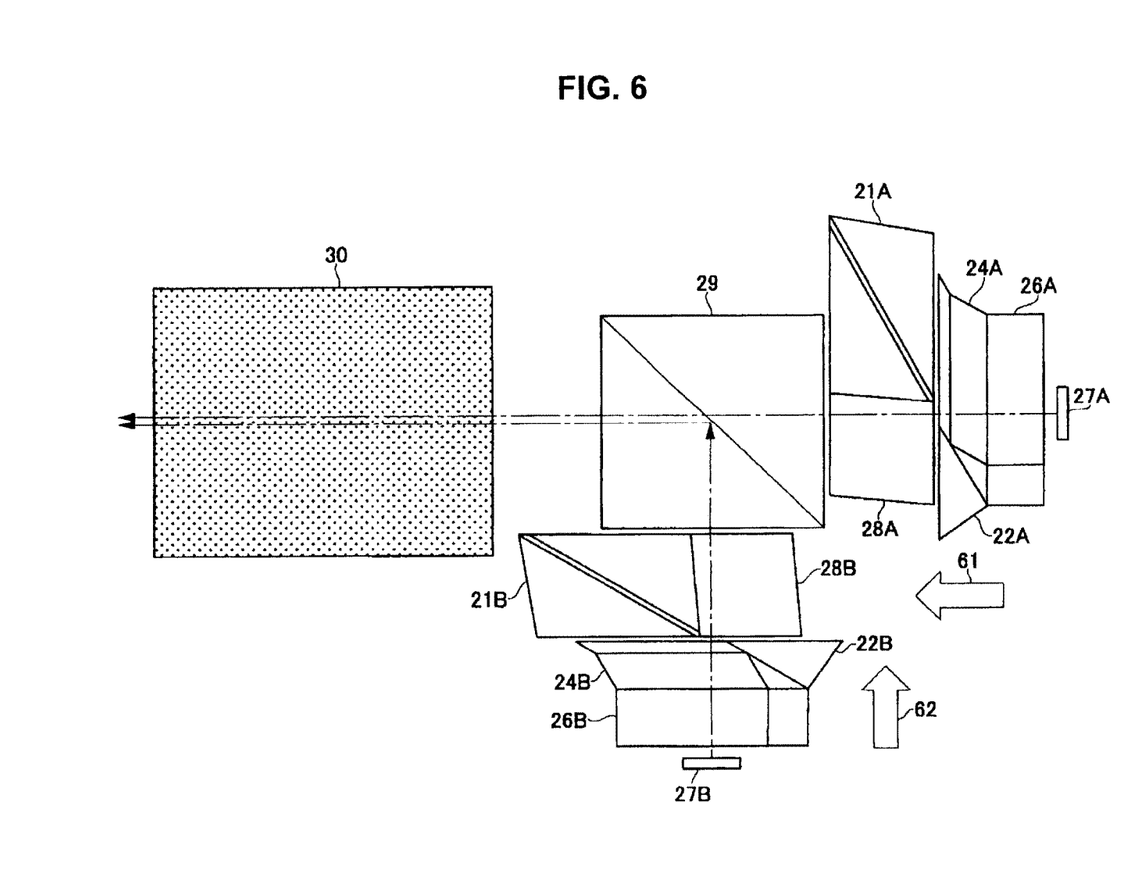
FIG. 6 is a schematic configuration view of an image projection apparatus of the second embodiment.

FIGS. 4 to 6 are schematic configuration views of an image projection apparatus of a second embodiment. FIG. 6 is a top view of an optical block. In FIG. 4, a plane view seen in the direction of an arrow 61 in FIG. 6 is placed on the left side, and views in which optical parts denoted by 21A to 28A are extracted and seen in two directions that are different from the direction of the arrow 61 in FIG. 6 are placed on the right side. The corresponding parts in the view on the left side and the views on the right side are connected with broken lines. In FIG. 5, a plane view seen in the direction of an arrow 62 in FIG. 6 is placed on the right side, and views in which optical parts denoted by 21B to 28B are extracted and seen in two directions that are different from the direction of the arrow 62 in FIG. 6 are placed on the left side. The corresponding parts in the view on the right side and the views on the left side are connected with broken lines. In FIGS. 4 to 6, for the sake of clarity, some light valves or the like are omitted from the figures.

In addition, in each figure, the path of light is indicated by an arrow drawn with a thin solid line and an arrow drawn with a thin broken line.

According to the present embodiment, a difference in wavelength is applied, and micromirror-drive-type devices are used as light valves.

The image projection apparatus of the present embodiment includes the following components: light valves configured with micromirror-drive-type devices, a prism-type photosynthesizing glass member, a prism-type beam splitter, and a projection lens.

These components are placed such that their relative positional relationship has excellent precision.

For example, it is preferred to join these components to each other to configure an integrated optical block.

In addition, each micromirror-drive-type device (light valve) and the prism-type photosynthesizing glass member are preferably joined mechanically and fixed with a metal part or the like which is not shown.

Furthermore, although not shown, the image projection apparatus of the present embodiment is provided with a light source that emits mixed light RGB, which is a mixture of light of the three primary colors (red light, green light, and blue light). As the light source, a white light source, such as a white lamp, can be used. Light emitted from the projection lens is projected onto a screen or the like which is not shown; thus, images are displayed.

The image projection apparatus of the present embodiment includes, specifically, an optical system for projecting an image based on first image information, an optical system for projecting an image based on second image information, and a prism-type beam splitter and a projection lens which are shared by the optical systems.

Each optical system is provided with the above-described light source that emits mixed light RGB; that is, two light sources are included in total. A photosynthesizing glass member is provided for each of the two light sources. Furthermore, a prism, which is a photosynthesizing glass member, separates the mixed light RGB into light of the three primary colors (red light R, green light G, and blue light B), and a micromirror-drive-type device is provided for each of the light beams of the three colors obtained by the separation.

Hereinafter, the configuration and placement of each optical part will be described specifically.

The optical system (hereinafter called first optical system) for projecting an image based on the first image information is provided with a light source that emits mixed light RGB, which is a mixture of light of the three primary colors of light.

The first optical system includes micromirror-drive-type devices 23A, 25A, and 27A as a first reflection-type light valve group including three light valves, and also includes a prism 21A, a prism 22A, a prism 24A, a prism 26A, and a prism 28A, each of which is formed of a glass material, as a first prism-type photosynthesizing member.

The prism 21A and the prism 28A are placed in combination as a pair.

Note that the prism 21A and the prism 28A are separated by a narrow air space. Therefore, light that has passed through the prism 21A is totally reflected at a surface of the prism 21A that faces the prism 28A. This means that the two prisms 21A and 28A form a total reflection prism.

The prism 22A, the prism 24A, and the prism 26A are prism blocks having a function of decomposing and synthesizing three colors, which are called Phillips prisms. The prism 22A and the prism 24A are separated by a narrow air space, and the prism 24A and the prism 26A are joined with an adhesive. The cross-sectional shapes of the prisms 22A, 24A, and 26A are shown in the rightmost view in FIG. 4. In addition, a dichroic film which is not shown is formed on the emission surface (the surface on the prism 24A side) of the prism 22A and at the boundary between the prism 24A and the prism 26A.

Note that an illumination optical system which is not shown is provided between the light source and the prism 21A.

The micromirror-drive-type devices 23A, 25A, and 27A are placed to correspond to three light beams obtained by separation by the Phillips prisms (22A, 24A, and 26A), respectively. The micromirror-drive-type device 23A is placed to correspond to blue light. The micromirror-drive-type device 25A is placed to correspond to red light. The micromirror-drive-type device 27A is placed to correspond to green light.

In image display parts of the micromirror-drive-type devices 23A, 25A, and 27A, substantially square micromirrors are arranged as pixels. The direction of each micromirror can be changed rapidly in a binary manner with its diagonal line serving as a rotation axis. For example, as an on state, the mirror is inclined so that incident light is reflected in a direction perpendicular to the light valve surface, and as an off state, the mirror is not inclined so that light is regularly reflected as it is in a direction opposite to that of incident light to be discarded. Since the rotation axis of the micromirror is the diagonal line direction of the pixel, as is described here, each of the prisms 21A, 22A, 24A, 26A, and 28A is placed to be twisted by 45 degrees around the optical axis with respect to a prism-type beam splitter 29 so that regularly reflected light is discarded easily.

Note that the micromirror-drive-type devices 23A and 25A are omitted from the figure for the sake of clarity, except in the rightmost view showing the cross-sectional shapes in FIG. 4.

Like the first optical system, the optical system (hereinafter called second optical system) for projecting an image based on the second image information is provided with a light source that emits mixed light RGB.

The second optical system includes micromirror-drive-type devices 23B, 25B, and 27B as a second reflection-type light valve group including three light valves, and also includes a prism 21B, a prism 22B, a prism 24B, a prism 26B, and a prism 28B, each of which is formed of a glass material, as a second prism-type photosynthesizing member.

The prism 21B and the prism 28B are placed in combination as a pair. Note that the prism 21B and the prism 28B are separated by a narrow air space. Therefore, light that has passed through the prism 21B is totally reflected at a surface of the prism 21B that faces the prism 28B. This means that the two prisms 21B and 28B form a total reflection prism.

The prism 22B, the prism 24B, and the prism 26B are prism blocks having a function of decomposing and synthesizing three colors, which are called Phillips prisms. The prism 22B and the prism 24B are separated by a narrow air space, and the prism 24B and the prism 26B are joined with an adhesive. The cross-sectional shapes of the prisms 22B, 24B, and 26B are shown in the leftmost view in FIG. 5.

Note that an illumination optical system which is not shown is provided between the light source and the prism 21B.

The micromirror-drive-type devices 23B, 25B, and 27B are placed to correspond to three light beams obtained by separation by the Phillips prisms (22B, 24B, and 26B), respectively. The micromirror-drive-type device 23B is placed to correspond to blue light. The micromirror-drive-type device 25B is placed to correspond to red light. The micromirror-drive-type device 27B is placed to correspond to green light.

In image display parts of the micromirror-drive-type devices 23B, 25B, and 27B, micromirrors are arranged as pixels as in the image display parts of the micromirror-drive-type devices 23A, 25A, and 27A. Each of the prisms 21B, 22B, 24B, 26B, and 28B is placed to be twisted by 45 degrees around the optical axis with respect to the prism-type beam splitter 29 so that regularly reflected light is discarded easily.

Note that the micromirror-drive-type devices 23B and 25B are omitted from the figure for the sake of clarity, except in the leftmost view showing the cross-sectional shapes in FIG. 5.

The prism 28A of the first optical system and the prism 28B of the second optical system are each placed upstream from the prism-type beam splitter 29.

A projection lens 30 is placed downstream from the prism-type beam splitter 29.

Next, functions of projecting images in the image projection apparatus of the present embodiment will be described in order.

First, a function of projecting an image based on the first image information is described with reference to FIGS. 4 and 6.

The mixed light RGB including the three primary colors of light emitted from the light source which is not shown goes through the illumination optical system which is not shown to enter the prism 21A. Since the prism 21A and the prism 28A are separated by a narrow air space, light is totally reflected within the prism 21A and enters the prism 22A among the Phillips prisms.

Blue light of the three-color mixed light RGB that has entered the prism 22A is reflected by the dichroic film provided on the emission surface of the prism 22A, and green and red light is transmitted as it is. The blue light is internally reflected within the prism 22A and enters the micromirror-drive-type device 23A.

With regard to the red and green light that has been transmitted through the prism 22A, the red light is reflected by the dichroic film provided at the boundary between the prism 24A and the prism 26A and is internally reflected within the prism 24A to enter the micromirror-drive-type device 25A. Meanwhile, the green light that has been transmitted through the dichroic film enters the micromirror-drive-type device 27A.

With regard to the light that has entered the micromirror-drive-type devices 23A, 25A, and 27A, light reflected by the micromirrors in an on state proceeds back along the original path as it is, goes through the prism 21A and the prism 28A, and enters the prism-type beam splitter 29. Then, the light is transmitted through the prism-type beam splitter 29 and goes through the projection lens 30. Thus, an image is projected onto a screen which is not shown.

Light reflected by the micromirrors in an off state does not proceed to the prism-type beam splitter 29. Instead, the light proceeds along the path which is typically represented by a broken-line arrow Lx drawn in the micromirror-drive-type device 27A part, to be discarded to the outside of the prisms 22A, 24A, and 26A.

The time ratio between the on state and the off state per unit time of the micromirrors of the micromirror-drive-type devices 23A, 25A, and 27A is changed based on the first image information. Thus, the inclinations of the micromirrors are converted to light-dark information of light that proceeds to the prism-type beam splitter 29.

Next, a function of projecting an image based on the second image information is described with reference to FIGS. 5 and 6.

The mixed light RGB including the three primary colors of light emitted from the light source which is not shown goes through the illumination optical system which is not shown to enter the prism 21B. Since the prism 21B and the prism 28B are separated by a narrow air space, light is totally reflected within the prism 21B and enters the prism 22B among the Phillips prisms.

Blue light of the three-color mixed light RGB that has entered the prism 22B is reflected by the dichroic film provided on the emission surface of the prism 22B, and green and red light is transmitted as it is. The blue light is internally reflected within the prism 22B and enters the micromirror-drive-type device 23B.

With regard to the red and green light that has been transmitted through the prism 22B, the red light is reflected by the dichroic film provided at the boundary between the prism 24B and the prism 26B and is internally reflected within the prism 24B to enter the micromirror-drive-type device 25B. Meanwhile, the green light that has been transmitted through the dichroic film enters the micromirror-drive-type device 27B.

With regard to the light that has entered the micromirror-drive-type devices 23B, 25B, and 27B, light reflected by the micromirrors in an on state proceeds back along the original path as it is, goes through the prism 21B and the prism 28B, and enters the prism-type beam splitter 29. Then, the light is reflected by the prism-type beam splitter 29 and goes through the projection lens 30. Thus, an image is projected onto a screen which is not shown.

Light reflected by the micromirrors in an off state does not proceed to the prism-type beam splitter 29. Instead, the light proceeds along the path which is typically represented by a broken-line arrow Lx drawn in the micromirror-drive-type device 27B part, to be discarded to the outside of the prisms 22B, 24B, and 26B.

The time ratio between the on state and the off state per unit time of the micromirrors of the micromirror-drive-type devices 23B, 25B, and 27B is changed based on the second image information. Thus, the inclinations of the micromirrors are converted to light-dark information of light that proceeds to the prism-type beam splitter 29.

Figure 7:
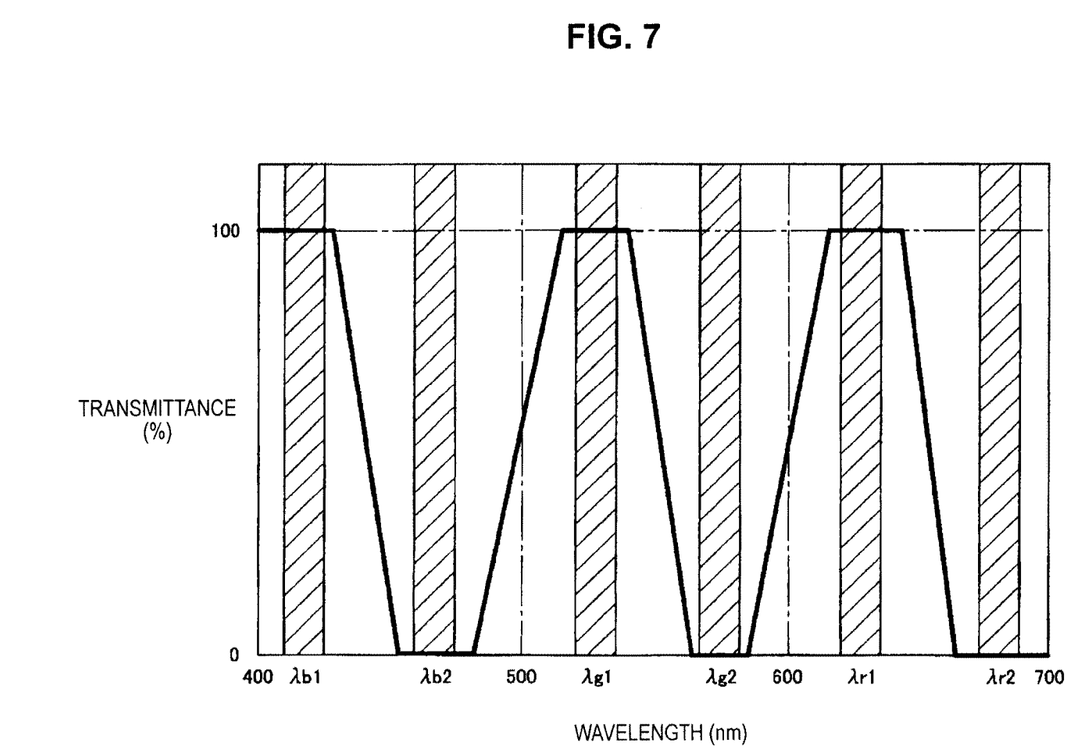
FIG. 7 is a view illustrating a mode of the spectral properties of a beam splitter film in the second embodiment.

Here, the properties of a beam splitter film used in the prism-type beam splitter 29 are described in detail.

Light source light for projecting an image based on the first image information includes the three primary colors of light including blue, green, and red. The central values of their wavelength bands are λb1 for blue, λg1 for green, and λr1 for red. Light source light for projecting an image based on the second image information also includes the three primary colors of light including blue, green, and red. The central values of their wavelength bands are λb2 for blue, λg2 for green, and λr2 for red.

FIG. 7 illustrates a mode of the spectral properties of the beam splitter film used in the prism-type beam splitter 29.

As illustrated in FIG. 7, the beam splitter film is designed such that light of λb1, λg1, and λr1 (indicated by diagonally hatched ranges in the wavelength bands) is transmitted and light of λb2, λg2, and λr2 (also indicated by diagonally hatched ranges in the wavelength bands) is reflected.

As is described here, in the present embodiment, an image based on the first image information and an image based on the second image information have different wavelengths.

Accordingly, for example, these images are viewed concurrently with glasses including a filter that cuts light of the bands κb1, λg1, and λr1 for the right eye and a filter that cuts light of the bands λb2, λg2, and λr2 for the left eye. Thus, when the image based on the first image information and the image based on the second image information are projected as an image for the left eye and an image for the right eye, respectively, the images can be viewed as 3D images.

It should be understood that the left and right in the above combination can be reversed.

In the image projection apparatus of the present embodiment, the left and right images can be separated more efficiently by particularly using laser light for the light source. This is because, since laser light generally has linear spectra in which the spread of wavelength is narrow, the wavelength bands to be separated are narrowed, which makes the beam splitter film relatively easy to design and form.

The intervals between the wavelength bands are preferably 15 nm or more, further preferably 20 nm or more. This is because such intervals make the beam splitter film relatively easy to design and form.

In the case of separating the first image information and the second image information by using a difference in the wavelength of light in this manner, no problem is caused by disturbance of polarization on the screen; hence, there is no need to use a bead screen. For example, images may be projected onto a matte screen which is generally used, the wall, or the like. Furthermore, this method is free from concern about crosstalk, which is a phenomenon where, in the case of 3D images using linear polarization, an image for one eye leaks to the other eye when a viewer wearing the glasses inclines his/her head.

Also in the image projection apparatus of the present embodiment, when 2D images are viewed, the first image information and the second image information are projected as the same image information. In this case, the screen need not be a screen where the polarization state of reflected light is maintained, and the glasses are unnecessary.

It is also possible to display 2D images by turning off one of the first image information and the second image information.

Although the image projection apparatus of the present embodiment includes a large number of optical parts as described above, the whole apparatus can be configured to have a small size.

For example, by adopting a micromirror-drive-type device with a diagonal dimension of an image display range of 40 mm and setting an F value of the illumination system to 3.0 or more, the size of the prism-type beam splitter 29, which is the largest member, can be set to 80 mm square or smaller. Thus, the prism-type beam splitter 29 can be fabricated with a size that is practical for production.

In addition, by using a micromirror-drive-type device with a diagonal dimension of an image display range of 18 mm or more in combination with a laser light source, a cinema projector having a total output of 15000 lumens or more for 2D images can be implemented. With this brightness, sufficient brightness for watching movies can be achieved even at theaters with mid-size or smaller screens.

In the image projection apparatus of the present embodiment, it is preferred to use a glass material with a refractive index nd of 1.84 or more for the first prism-type photosynthesizing member, the second prism-type photosynthesizing member, and the prism-type polarizing beam splitter, each of which is formed of a glass material. Using a glass material with a refractive index nd of 1.84 or more allows a reduction in the size of a luminous flux that is reflected by the micromirror-drive-type device, goes through the prism-type polarizing beam splitter, and enters the projection lens. Thus, the sizes of the prism-type polarizing beam splitter and the projection lens can be set small enough to be practical for production.

According to the configuration of the image projection apparatus of the present embodiment described above, the first image information and the second image information are reflected by the respective sets of micromirror-drive-type devices, synthesized on one optical axis by the prism-type beam splitter, and projected with the single projection lens.

With this configuration, each piece of image information is displayed using the whole of image display parts of the micromirror-drive-type devices. Therefore, neither resolution nor brightness is sacrificed. Furthermore, there is no need for time division of images and no sacrifice of brightness accompanying such time division.

Therefore, it is possible to provide an image projection apparatus that displays 3D images, without sacrificing brightness or resolution.

Furthermore, since the first image information and the second image information are synthesized on one optical axis, by setting out the two sets of micromirror-drive-type devices in advance such that the images are superimposed on the screen, labor for adjusting the superimposition of left and right images on-site (e.g., at the theater) is saved.

In addition, since it is unnecessary to provide a plurality of image projection apparatuses, cost can be saved and the apparatus does not need a large installation space.

In addition, 2D images can be projected by setting the same image information as the two pieces of image information or turning off one of the two pieces of image information, and 3D images can be projected by setting different pieces of image information corresponding to the left and right eyes as the two pieces of image information. Since the switching between 2D images and 3D images can be performed by only switching the image information in this way, there is no need for labor and time for a lens replacement or the like, and the switching between 2D images and 3D images can be performed easily and instantaneously.

According to the configuration of the image projection apparatus of the present embodiment, a maintenance-free image projection apparatus that can switch between and display 2D images and 3D images and does not require labor for adjustment of the apparatus, replacement of a part, or the like can be implemented.

The method of separating the first image information and the second image information by using a difference in the wavelength of light, which is adopted in the image projection apparatus of the second embodiment, can also be applied to the image projection apparatus of the first embodiment.

In the case of applying the method to the image projection apparatus of the first embodiment, the prism-type beam splitter 18 using a difference in polarization is replaced with the type of the prism-type beam splitter 29 using a difference in wavelength, and the wavelengths of light source light are selected in accordance with the spectral properties of the beam splitter film of the prism-type beam splitter 29, as in the second embodiment.

When 2D images are displayed, the same image information is set as the two pieces of image information with the difference in the wavelength of light kept.

In the case of using a laser for the light source in the image projection apparatuses of the first embodiment and the second embodiment, the kind of the laser is not particularly limited. There are lasers such as a solid-state laser, a gas laser, a semiconductor laser, and a second-harmonic laser using nonlinear optical phenomena. Any appropriate laser can be selected in overall consideration of the wavelength to be used, output, size of the apparatus, price, and the like.

In addition, both in the first embodiment and the second embodiment, projection of 3D images using a time division method can be performed.

For example, an image based on the first image information for the right eye is projected with on and off repeated rapidly, and an image based on the second image information for the left eye is projected with on and off repeated in a phase reversed from that of the first image information. When the images are viewed with glasses including a shutter that operates in synchronization with the on and off of the first image information for the right eye and a shutter that operates in synchronization with the on and off of the second image information for the left eye, 3D images can be viewed. Also in this case, no problem is caused by disturbance of polarization on the screen; hence, there is no need to use a bead screen. 3D images projected onto a matte screen which is generally used, the wall, or the like can be viewed.

Additionally, the present technology may also be configured as below.

(1)

An image projection apparatus including:
one or more light sources configured to emit light including one or more of three primary colors of light;
one or more illumination optical systems configured to illuminate light from the light sources;
a first reflection-type light valve group including three light valves corresponding to the three primary colors of light, the first reflection-type light valve group being configured to modulate incident light from the illumination optical systems based on first image information;
a second reflection-type light valve group including three light valves corresponding to the three primary colors of light, the second reflection-type light valve group being configured to modulate incident light from the illumination optical systems based on second image information;
a first prism-type photosynthesizing member having a function of synthesizing, on one optical axis, light that is reflected by the first reflection-type light valve group, the light having been separated into the three primary colors; a second prism-type photosynthesizing member having a function of synthesizing, on one optical axis, light that is reflected by the second reflection-type light valve group, the light having been separated into the three primary colors; and
a prism-type beam splitter configured to synthesize, on one optical axis, light that has been reflected by the first reflection-type light valve group and modulated based on the first image information and light that has been reflected by the second reflection-type light valve group and modulated based on the second image information.

(2)

The image projection apparatus according to (1),
wherein the first reflection-type light valve group and the second reflection-type light valve group are reflection-type liquid crystal devices.

(3)

The image projection apparatus according to (1) or (2),
wherein the first prism-type photosynthesizing member and the second prism-type photosynthesizing member include three polarizing beam splitters corresponding to the three primary colors and a cross dichroic prism configured to synthesize light of the three primary colors on one optical axis, and the prism-type beam splitter is a polarizing beam splitter whose spectral properties cover the three primary colors defined by the light sources.

(4)

The image projection apparatus according to (1),
wherein the first reflection-type light valve group and the second reflection-type light valve group are micromirror-drive-type devices.

(5)

The image projection apparatus according to (1) or (4),
wherein the first prism-type photosynthesizing member and the second prism-type photosynthesizing member include a Phillips prism and a total reflection prism.

(6)

The image projection apparatus according to any of (1) to (5),
wherein the first reflection-type light valve group, the second reflection-type light valve group, the first prism-type photosynthesizing member, the second prism-type photosynthesizing member, and the prism-type beam splitter are fixed to be integrated.

(7)

The image projection apparatus according to any of (1) to (6),
wherein a glass material having a refractive index nd of 1.84 or more is used for the first prism-type photosynthesizing member, the second prism-type photosynthesizing member, and the prism-type beam splitter.

(8)

The image projection apparatus according to any of (1) to (7),
wherein the light sources are laser light sources.

(9)

The image projection apparatus according to any of (1) to (8), wherein each light valve included in the first reflection-type light valve group and the second reflection-type light valve group has a diagonal dimension of an image display range of greater than or equal to 18 mm and less than or equal to 40 mm.

The present technology is not limited to the above embodiments, and may assume various alternative configurations within the scope of the present technology.

REFERENCE SIGNS LIST 1A, 1B, 7A, 7B, 12A, 12B polarizing plate
2A, 2B, 8A, 8B, 13A, 13B polarizing beam splitter
3A, 3B, 9A, 9B, 14A, 14B reflection-type liquid crystal device
4A, 4B, 10A, 10B, 15A, 15B spacer glass
5A, 5B, 11A, 11B, 16A, 16B, 17 half-wave plate
6A, 6B cross dichroic prism
18, 29 prism-type beam splitter
19, 30 projection lens
21A, 21B, 22A, 22B, 24A, 24B, 26A, 26B, 28A, 28B prism
23A, 23B, 25A, 25B, 27A, 27B micromirror-drive-type device

The invention claimed is:

1. An image projection apparatus, comprising:
a plurality of light sources configured to emit light including three primary colors of light;
a plurality of illumination optical systems configured to illuminate light from the plurality of light sources;
a plurality of first polarizing plates configured to receive light from the plurality of illumination optical systems;
a plurality of second polarizing plates configured to receive light from the plurality of illumination optical systems;
a first reflection-type light valve group including three light valves corresponding to the three primary colors of light, the first reflection-type light valve group being configured to modulate incident light from the plurality of illumination optical systems based on first image information;
a second reflection-type light valve group including light valves corresponding to the three primary colors of light, the second reflection-type light valve group being configured to modulate incident light from the plurality of illumination optical systems based on second image information;
a first prism-type photosynthesizing member having a function of synthesizing, on a first optical axis, first light that is reflected by the first reflection-type light valve group, the first light having been separated into the three primary colors, the first prism-type photosynthesizing member including three polarizing beam splitters configured to each receive polarized light directly from a corresponding first polarizing plate to reflect to the first reflection-type light valve group and corresponding to the three primary colors, and the first prism-type photosynthesizing member including a first cross dichroic prism configured to synthesize light of the three primary colors on the first optical axis;
a second prism-type photosynthesizing member having a function of synthesizing, on a second optical axis that is orthogonal to the first optical axis, second light that is reflected by the second reflection-type light valve group, the second light having been separated into the three primary colors, the second prism-type photosynthesizing member including three polarizing beam splitters configured to each receive polarized light directly from a corresponding second polarizing plate to reflect to the second reflection-type light valve group and corresponding to the three primary colors, and the second prism-type photosynthesizing member including a second cross dichroic prism configured to synthesize light of the three primary colors on the second optical axis;
a prism-type beam splitter configured to synthesize the first light from the first prism-type photosynthesizing member modulated based on the first image information and the second light from the second prism-type photosynthesizing member modulated based on the second image information; and
a first optical group having a plurality of optical devices, each optical device of the plurality of optical devices corresponding to a respective polarizing beam splitter, each optical device of the plurality of optical devices being respectively positioned between a polarizing beam splitter and the first cross dichroic prism, and each optical device of the plurality of optical devices being configured to rotate the light reflected from a respective polarizing beam splitter, wherein
a first surface of the first prism-type photosynthesizing member is orthogonal to a second surface of the second prism-type photosynthesizing member, the first surface being a surface of the three polarizing beam splitters of first prism-type photosynthesizing member that receives the polarized light from the first polarizing plate, and the second surface being a surface of the three polarizing beam splitters of second prism-type photosynthesizing member that receives the polarized light from the second polarizing plate,
the first cross dichroic prism and the second cross dichroic prism are affixed to the prism-type beam splitter, and
the first reflection-type light valve group, the second reflection-type light valve group, the first prism-type photosynthesizing member, the second prism-type photosynthesizing member, and the prism-type beam splitter are connected to each other, fixed and integrated.

2. The image projection apparatus according to claim 1, wherein the first reflection-type light valve group and the second reflection-type light valve group are reflection-type liquid crystal devices.

3. The image projection apparatus according to claim 1, wherein the prism-type beam splitter is a polarizing beam splitter whose spectral properties cover the three primary colors defined by the light sources.

4. The image projection apparatus according to claim 1, wherein a glass material having a refractive index nd of 1.84 or more is used for the first prism-type photosynthesizing member, the second prism-type photosynthesizing member, and the prism-type beam splitter.

5. The image projection apparatus according to claim 1, wherein the plurality of light sources are laser light sources.

6. The image projection apparatus according to claim 4, wherein each light valve included in the first reflection-type light valve group and the second reflection-type light valve group has a diagonal dimension of an image display range of greater than or equal to 18 mm and less than or equal to 40 mm.

7. The image projection apparatus according to claim 1, further comprising:
a second optical group having a plurality of second optical devices, each second optical device of the plurality of second optical devices corresponding to a respective polarizing beam splitter of the second prism-type photosynthesizing member, each second optical device of the plurality of second optical devices corresponding being respectively positioned between a polarizing beam splitter and the second cross dichroic prism of the second prism-type photosynthesizing member, and each second optical device of the plurality of second optical devices corresponding being configured to rotate the light reflected from a respective polarizing beam splitter.

8. The image projection apparatus according to claim 1, wherein each optical device of the first optical group is affixed to the first cross dichroic prism.

9. The image projection apparatus according to claim 7, wherein each second optical device of the second optical group is affixed to the second cross dichroic prism.

10. The image projection apparatus according to claim 1, wherein the first reflection-type light valve group is fixed to the prism-type beam splitter in a direction of a first plane and the second reflection-type valve group is fixed to the prism-type beam splitter in a direction of a second plane different from the first plane.

11. The image projection apparatus according to claim 4, wherein the glass material has a refractive index nd of greater than 1.84.

* * * * *